United States Patent
Chen et al.

(10) Patent No.: US 10,584,809 B2
(45) Date of Patent: Mar. 10, 2020

(54) WATER PIPE FOR MINING OPERATIONS

(71) Applicant: SABIC Global Technologies, Bergen op Zoom (NL)

(72) Inventors: Guangtao Chen, Shanghai (CN); Ying Na, Shanghai (CN); Yonglei Xu, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 140 days.

(21) Appl. No.: 15/768,181

(22) PCT Filed: Oct. 14, 2015

(86) PCT No.: PCT/CN2015/091951
§ 371 (c)(1),
(2) Date: Apr. 13, 2018

(87) PCT Pub. No.: WO2017/063161
PCT Pub. Date: Apr. 20, 2017

(65) Prior Publication Data
US 2018/0328520 A1 Nov. 15, 2018

(51) Int. Cl.
*F16L 9/12* (2006.01)
*C08K 5/521* (2006.01)
(Continued)

(52) U.S. Cl.
CPC ............ *F16L 9/12* (2013.01); *C08K 5/521* (2013.01); *C08L 25/06* (2013.01); *C08L 25/10* (2013.01); *C08L 53/025* (2013.01)

(58) Field of Classification Search
CPC . F16L 9/12; C08K 5/521; C08L 25/06; C08L 53/025; C08L 25/10
See application file for complete search history.

(56) References Cited

U.S. PATENT DOCUMENTS

| 6,706,350 B2 | 3/2004 | Sato et al. |
| 8,017,697 B2 | 9/2011 | Carrillo et al. |

(Continued)

FOREIGN PATENT DOCUMENTS

| CN | 1778837 A | 5/2006 |
| CN | 101570631 | 11/2009 |

(Continued)

OTHER PUBLICATIONS

International Search Report for International Application No. PCT/CN2015/091951; International filing Date: Oct. 14, 2015; dated Jul. 21, 2016; 8 pages.

(Continued)

*Primary Examiner* — Michael C Miggins
(74) *Attorney, Agent, or Firm* — Cantor Colburn LLP

(57) ABSTRACT

A water pipe for mining operations has an outer diameter of 20 to 200 millimeters and a wall thickness of 2 to 20 millimeters. The water pipe includes a composition containing 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant. The water pipe exhibits a desirable balance of impact strength, tensile strength, burst pressure resistance, static pressure resistance, and flame retardancy.

18 Claims, 1 Drawing Sheet

(51) Int. Cl.
    *C08L 25/06* (2006.01)
    *C08L 25/10* (2006.01)
    *C08L 53/02* (2006.01)

(56) References Cited

U.S. PATENT DOCUMENTS

| | | |
|---|---|---|
| 8,048,610 B2 | 11/2011 | Ohsawa et al. |
| 8,129,454 B2 | 3/2012 | Fortuyn et al. |
| 8,669,332 B2 | 3/2014 | Carrillo et al. |
| 8,968,979 B2 | 3/2015 | Takemura et al. |
| 2009/0082520 A1 | 3/2009 | Zijlma et al. |
| 2014/0128522 A1 | 5/2014 | Lietzau et al. |
| 2014/0200294 A1 | 7/2014 | Furukawa et al. |

FOREIGN PATENT DOCUMENTS

| | | |
|---|---|---|
| CN | 101880451 | 11/2010 |
| CN | 102234419 A | 11/2011 |
| CN | 103012934 | 4/2013 |
| CN | 103102673 A | 5/2013 |
| EP | 1404757 B1 | 3/2008 |
| JP | 2014159513 A | 9/2014 |

OTHER PUBLICATIONS

Written Opinion of the International Searching Authority for International Application No. PCT/CN2015/091951; International filing Date: Oct. 14, 2015; dated Jul. 21, 2016; 4 pages.

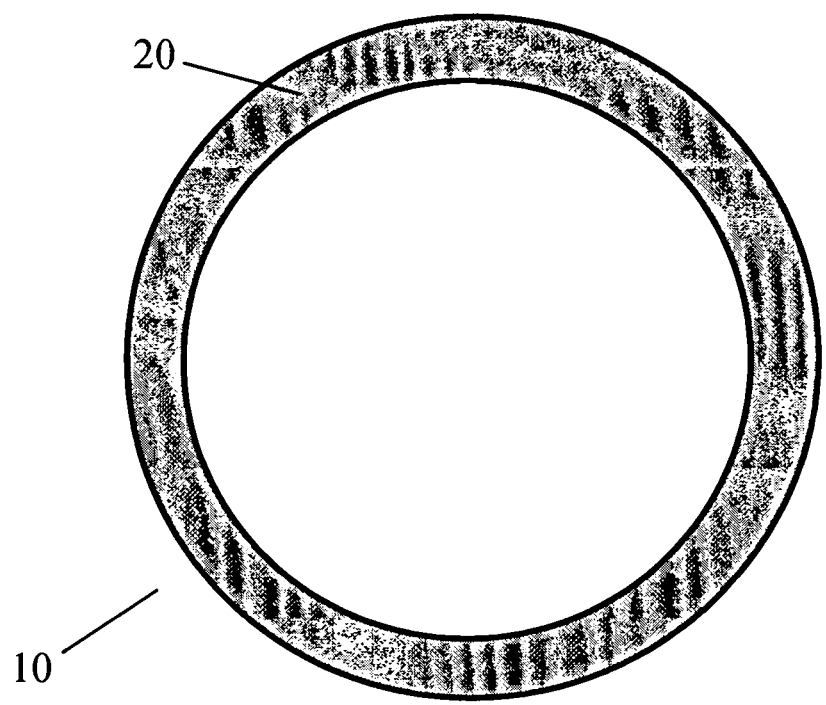

WATER PIPE FOR MINING OPERATIONS

CROSS-REFERENCE TO RELATED APPLICATIONS

This application is a National Stage application of PCT/CN2015/091951, filed Oct. 14, 2015, which is incorporated by reference herein in its entirety.

BACKGROUND OF THE INVENTION

In the mining industry, metal pipes are commonly used for the delivery of water. Metal pipes have the disadvantages of high weight, susceptibility to corrosion, and the potential to create sparks. As alternative to metal pipes, pipes made from various plastics have been employed. All plastic pipes benefit from reduced weight, reduced corrosion, and reduced sparking relative to metal pipes. However, plastic pipes have other disadvantages. Pipes made from poly(vinyl chloride) (PVC) are relatively brittle, and can break on impact. Pipes made from high density polyethylene (HDPE) and polypropylene (PP) exhibit good toughness (low brittleness), but they can withstand only relatively low burst pressure and static pressure. Ultrahigh molecular weight polyethylene pipe are difficult to extrude. Moreover, many of the above-described plastic pipes incorporate halogenated flame retardants, which can release hazardous gases in the event of a fire.

There remains a need for a mining industry water pipe that exhibit an improved balance of impact strength, tensile strength, burst pressure resistance, static pressure resistance, and flame retardancy.

BRIEF SUMMARY OF EMBODIMENTS OF THE INVENTION

One embodiment is a water pipe for mining operations, wherein the water pipe has an outer diameter of 20 to 200 millimeters and a wall thickness of 2 to 20 millimeters; and wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

Another embodiment is a water pipe for mining operations, wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

This and other embodiments are described in detail below.

BRIEF DESCRIPTION OF THE FIGURE

The FIGURE is a cross-sectional view of a water pipe 10 for mining operations, the pipe wall 20 consisting of the poly(phenylene ether) composition.

DETAILED DESCRIPTION OF THE INVENTION

The present inventors have determined that an improved balance of impact strength, tensile strength, burst pressure resistance, static pressure resistance, and flame retardancy is provided by a water pipe having specific dimensions and a specific composition.

One embodiment is a water pipe for mining operations, wherein the water pipe has an outer diameter of 20 to 200 millimeters and a wall thickness of 2 to 20 millimeters; and wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

The water pipe has an outer diameter of 20 to 200 millimeters. Within this range, the outer diameter of the pipe can be 20 to 160 millimeters, specifically 40 to 140 millimeters, more specifically 60 to 120 millimeters. The water pipe has a wall thickness of 2 to 20 millimeters. Within this range, the wall thickness can be 2 to 15 millimeters, specifically 3 to 15 millimeters, more specifically 4 to 12 millimeters. The water pipe is typically annular in cross-section, but variations in cross-sectional shape are possible. The FIGURE is a cross-sectional view of a water pipe 10 for mining operations, the pipe wall 20 consisting of the poly(phenylene ether) composition.

The water pipe comprises a composition, sometimes referred to herein as a poly(phenylene ether) composition. In some embodiments, the water pipe consists of a single layer of the composition. In other embodiments, the water pipe comprises a single layer of the composition and at least one additional layer on the outside or inside of the layer of the composition and in contact with it. For example, the water pipe can comprise an internal layer of the poly(phenylene ether) composition, and an external layer of a high-density polyethylene-based composition. As another example, the water pipe can comprise an internal layer of a metal-based (e.g., iron-based or steel-based) composition and an external layer of the poly(phenylene ether) composition.

The composition comprises a poly(phenylene ether). Poly(phenylene ether)s include those comprising repeating structural units having the formula

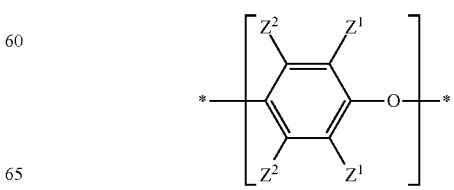

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

weight of the monohydric phenol and the hydroxyaryl-terminated polysiloxane. The hydroxyaryl-diterminated polysiloxane can comprise a plurality of repeating units having the structure

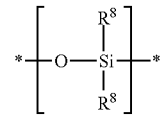

wherein each occurrence of $R^8$ is independently hydrogen, $C_1$-$C_{12}$ hydrocarbyl or $C_1$-$C_{12}$ halohydrocarbyl; and two terminal units having the structure

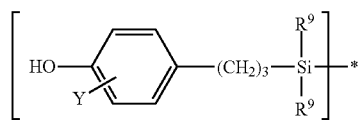

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

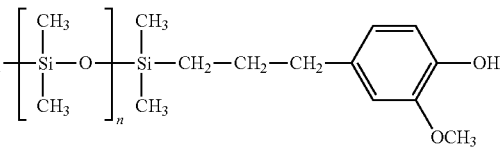

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly (2,6-dimethyl-1,4-phenylene ether) having an intrinsic viscosity of 0.4 to 0.5 deciliter per gram, determined by Ubbelohde viscometer at 25° C. in chloroform.

In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, specifically 0.1 to 1 weight percent, more specifically 0.2 to 0.8 weight percent, of siloxane groups to the composition as a whole.

The composition comprises the poly(phenylene ether) in an amount of 58 to 82 parts by weight, based on 100 parts by weight total of the poly(phenylene ether), the hydrogenated block copolymer, the polystyrene, and the flame retardant. Within this range, the poly(phenylene ether) amount can be 60 to 78 parts by weight, specifically 65 to 75 parts by weight.

In addition to the poly(phenylene ether), the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In some embodiments, the hydrogenated block copolymer has a weight average molecular weight of 40,000 to 400,000 daltons. The number average molecular weight and the weight average molecular weight can be determined by gel permeation chromatography and based on comparison to polystyrene standards. In some embodiments, the hydrogenated block copolymer has a weight average molecular weight of 200,000 to 400,000 daltons, specifically 220,000 to 350,000 daltons. In other embodiments, the hydrogenated block copolymer has a weight average molecular weight of 40,000 to 200,000 daltons, specifically 40,000 to 180,000 daltons, more specifically 40,000 to 150,000 daltons.

The alkenyl aromatic monomer used to prepare the hydrogenated block copolymer can have the structure

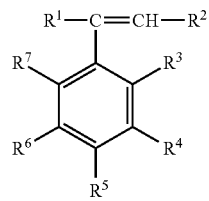

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

In some embodiments, the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer. In these embodiments, the polystyrene-poly(ethylene-propylene)-polystyrene triblock copolymer can, optionally, have a weight average molecular weight of 240,000 to 300,000 daltons, determined by to size exclusion chromatography using polystyrene standards.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene); and from Kuraray as SEPTON™ 8006 (having about 33 weight percent polystyrene) and 8007 (having about 30 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used. In some embodiments, the hydrogenated block copolymer comprises a polystyrene poly(ethylene-butylene)-polystyrene triblock copolymer having a weight average molecular weight of at least 100,000 daltons, specifically 200,000 to 400,000 daltons.

The composition comprises a hydrogenated block copolymer in an amount of 8 to 18 parts by weight, based on 100 parts by weight total of the poly(phenylene ether), the hydrogenated block copolymer, the polystyrene, and the flame retardant. Within this range, the hydrogenated block copolymer amount can be 9 to 18 parts by weight, specifically 12 to 16 parts by weight.

In addition to the poly(phenylene ether) and the hydrogenated block copolymer, the composition optionally comprises a polystyrene selected from the group consisting of homopolystyrenes, rubber-modified polystyrenes, and combinations thereof.

As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene consists of atactic homopolystyrene. In some embodiments, the homopolystyrene has a melt flow rate of 5 to 12 grams per 10 minutes, measured at 200° C. and 5 kilogram load according to ASTM D 1238-13.

Rubber-modified polystyrene comprises polystyrene and polybutadiene. Rubber-modified polystyrenes are sometimes referred to as "high-impact polystyrenes" or "HIPS". In some embodiments, the rubber-modified polystyrene comprises 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene.

The composition comprises the polystyrene in an amount of 0 to 15 parts by weight, based on 100 parts by weight total of the poly(phenylene ether), the hydrogenated block copolymer, the polystyrene, and the flame retardant. In some embodiments, the polystyrene amount is 0 to 13 parts by weight, specifically 0 to 10 parts by weight, more specifically 0 to 5 parts by weight. In some embodiments, the composition excludes the polystyrene.

In some embodiments, wherein the composition comprises 1 to 15 parts by weight of the polystyrene. In some of these embodiments, the polystyrene consists of the homopolystyrene. In others of these embodiments, polystyrene consists of the rubber-modified polystyrene.

In some embodiments, the composition excludes the polystyrene.

In addition to the poly(phenylene ether), the hydrogenated block copolymer, and the optional polystyrene, the composition comprises a flame retardant comprising an organophosphate ester.

Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

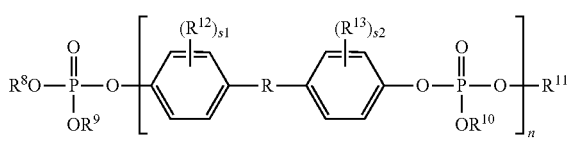

wherein R is independently at each occurrence a $C_1$-$C_{12}$ alkylene group; $R^{12}$ and $R^{13}$ are independently at each occurrence a $C_1$-$C_5$ alkyl group; $R^8$, $R^9$, and $R^1$ are independently a $C_1$-$C_{12}$ hydrocarbyl group; $R^{10}$ is independently at each occurrence a $C_1$-$C_{12}$ hydrocarbyl group; n is 1 to 25; and s1 and s2 are independently an integer equal to 0, 1, or 2. In some embodiments $OR^8$, $OR^9$, $OR^{10}$, and $OR^1$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame retardant consists of the organophosphate ester. In other embodiments, the flame retardant further comprises one or more of a metal dialkylphosphinate (such as aluminum tris(diethylphosphinate)), a linear or cyclic bis(phenoxy)phosphazene, melamine phosphate, melamine pyrophosphate, melamine polyphosphate, melamine cyanurate, and metal hydroxides (such as magnesium hydroxide, aluminum hydroxide, and cobalt hydroxide).

The composition comprises the flame retardant in an amount of 10 to 20 parts by weight, based on 100 parts by weight total of the poly(phenylene ether), the hydrogenated block copolymer, the polystyrene, and the flame retardant. Within this range, the flame retardant amount can be 12 to 18 parts by weight, specifically 12 to 16 parts by weight.

The composition can, optionally, further comprise an additive selected from the group consisting of stabilizers, lubricants, processing aids, drip retardants, UV blockers, dyes, pigments, antioxidants, anti-static agents, mineral oil, metal deactivators, and combinations thereof. The composition comprises the additive in an amount of 0 to 5 parts by weight, based on 100 parts by weight total of the poly(phenylene ether), the hydrogenated block copolymer, the polystyrene, and the flame retardant.

Components not described herein a required can be minimized or excluded. For example, in some embodiments, the composition comprises 0 to 2 weight percent of polyamides, and in some embodiments the composition excludes polyamides. As another example, in some embodiments, the composition comprises 0 to 2 weight percent of polyolefins, and in some embodiments the composition excludes polyolefins. As another example, in some embodiments, the composition comprises 0 to 2 weight percent of polyesters, and in some embodiments the composition excludes polyesters. As another example, in some embodiments the composition comprises 0 to 2 weight percent of unhydrogenated block copolymers of alkenyl aromatic monomers and conjugated dienes, and in some embodiment the composition excludes such unhydrogenated block copolymers.

In a very specific embodiment, the composition consists of 58 to 82 parts by weight poly(phenylene ether), 8 to 18 parts by weight of the hydrogenated block copolymer, 0 to 15 parts by weight of the polystyrene selected from the group consisting of homopolystyrenes, rubber-modified polystyrenes, and combinations thereof, 10 to 20 parts by weight of the flame retardant, and 0 to 5 parts by weight of an additive selected from the group consisting of stabilizers, lubricants, processing aids, drip retardants, UV blockers, dyes, pigments, antioxidants, anti-static agents, mineral oil, metal deactivators, and combinations thereof.

In another very specific embodiment, the water pipe consists of the composition; the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform; the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer, and wherein the polystyrene-poly(ethylene-propylene)-polystyrene triblock copolymer has a weight average molecular weight of 240,000 to 300,000 daltons, determined according to size exclusion chromatography using polystyrene standards; the flame retardant consists of the organophosphate ester, and wherein the organophosphate ester comprises bisphenol A bis(diphenyl phosphate); and the composition comprises 65 to 75 parts by weight of the poly(phenylene ether), 12 to 16 parts by weight of the hydrogenated block copolymer, 0 to 5 parts by weight of the polystyrene, and 12 to 16 parts by weight of the flame retardant.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 270 to 310° C., specifically 280 to 300° C.

The water pipe can be prepared by extruding molten composition through an annular die. Pipe extrusion can accompany compounding of the composition, or it can be a separate step intermediate pelletization of the composition. Pipe extrusion can be conduct at a melt temperature 240 to 300° C., specifically 240 to 280° C.

Another embodiment is a water pipe for mining operations, wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant. In this embodiment, the water pipe has no specific dimensions. The pipe can consist of a single layer of the composition. Alternatively, the pipe can comprise a layer of the composition and an external layer surrounding and in contact with the layer of the composition. For example, the water pipe can comprise an internal layer of the poly(phenylene ether) composition, and an external layer of a high-density polyethylene-based composition. Alternatively, the pipe can comprise a layer of the composition and an internal layer interior to and in contact with the layer of the composition. For example, the water pipe can comprise an internal layer of a metal-based (e.g., iron-based or steel-based) composition and an external layer of the poly(phenylene ether) composition.

The invention includes at least the following embodiments.

Embodiment 1

A water pipe for mining operations wherein the water pipe has an outer diameter of 20 to 200 millimeters and a wall thickness of 2 to 20 millimeters; and wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

Embodiment 2

The water pipe of embodiment 1, wherein the water pipe consists of the composition.

Embodiment 3

The water pipe of embodiment 1 or 2, wherein the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform.

Embodiment 4

The water pipe of any one of embodiments 1-3, wherein the composition comprises 65 to 75 parts by weight of the poly(phenylene ether).

Embodiment 5

The water pipe of any one of embodiments 1-4, wherein the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer.

Embodiment 6

The water pipe of embodiment 5, wherein the polystyrene-poly(ethylene-propylene)-polystyrene triblock copolymer has a weight average molecular weight of 240,000 to 300,000 daltons, determined by size exclusion chromatography using polystyrene standards.

Embodiment 7

The water pipe of any one of embodiments 1-6, wherein the composition comprises 12 to 16 parts by weight of the hydrogenated block copolymer.

Embodiment 8

The water pipe of any one of embodiments 1-7, wherein the composition comprises 1 to 15 parts by weight of the polystyrene.

Embodiment 9

The water pipe of embodiment 8, wherein the polystyrene consists of the homopolystyrene.

Embodiment 10

The water pipe of embodiment 8, wherein the polystyrene consists of the rubber-modified polystyrene.

Embodiment 11

The water pipe of any one of embodiments 1-7, wherein the composition excludes the polystyrene.

Embodiment 12

The water pipe of any of embodiments 1-11, wherein the flame retardant consists of the organophosphate ester.

Embodiment 13

The water pipe of any of embodiments 1-12, wherein the organophosphate ester comprises bisphenol A bis(diphenyl phosphate).

Embodiment 14

The water pipe of embodiment 1, wherein the composition consists of 58 to 82 parts by weight poly(phenylene ether), 8 to 18 parts by weight of the hydrogenated block copolymer, 0 to 15 parts by weight of the polystyrene selected from the group consisting of homopolystyrenes, rubber-modified polystyrenes, and combinations thereof, 10 to 20 parts by weight of the flame retardant, and 0 to 5 parts by weight of an additive selected from the group consisting of stabilizers, lubricants, processing aids, drip retardants, UV blockers, dyes, pigments, antioxidants, anti-static agents, mineral oil, metal deactivators, and combinations thereof.

Embodiment 15

The water pipe of embodiment 1, wherein the water pipe consists of the composition; wherein the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform; wherein the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer, and wherein the polystyrene-poly(ethylene-propylene)-polystyrene triblock copolymer has a weight average molecular weight of 240,000 to 300,000 daltons, determined according to size exclusion chromatography using polystyrene standards; wherein the flame retardant consists of the organophosphate ester, and wherein the organophosphate ester comprises bisphenol A bis(diphenyl phosphate); and wherein the composition comprises 65 to 75 parts by weight of the poly(phenylene ether), 12 to 16 parts by weight of the hydrogenated block copolymer, 0 to 5 parts by weight of the polystyrene, and 12 to 16 parts by weight of the flame retardant.

Embodiment 16

A water pipe for mining operations, wherein the water pipe comprises a composition comprising 58 to 82 parts by weight poly(phenylene ether), 8 to 18 parts by weight of a hydrogenated block copolymer of an alkenyl aromatic monomer and a conjugated diene, 0 to 15 parts by weight of polystyrene selected from the group consisting of homopolystyrenes, rubber-modified polystyrenes, and combinations thereof, and 10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-4, Comparative Examples 1-5

Components used to form extrusion molding compositions are summarized in Table 1.

TABLE 1

| Component | Description |
|---|---|
| FR-HDPE | Flame retardant high density polyethylene have a melt flow of about 0.3 grams/10 minutes measured according to ASTM D 1238-13 at 190° C. and 5 kilogram load; provided by Jin Coal Group. |
| PPE | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO ™ 646 from SABIC Innovative Plastics. |
| HIPS | High-impact polystyrene (rubber-modified polystyrene), CAS Reg. No. 9003-55-8, having a rubber content of 10.3 weight percent, and a mineral oil content of 1.5 weight percent; obtained as ET60 from Idemitsu. |
| PS | Atactic polystyrene, CAS Reg. No. 9003-53-6, having a melt flow index of about 8.5 grams per 10 minutes measured according to ASTM D 1238-13 at 200° C. and 5 kilogram load; obtained as STYRON ™ 680a General Purpose Polystyrene Resin from Styron. |
| SEBS G1651 | Polystyrene-poly(ethylene-butylene)-polystyrene triblock copolymer, CAS Reg. No. 66070-58-4, having a polystyrene content of about 30-33 weight percent, essentially no melt flow measured according to ASTM D 1238-13 at 230° C. and 5 kilogram load, and a weight average molecular weight of about 240,000-300,000 daltons; obtained as KRATON ™ G1651 from Kraton Performance Polymers Inc. |
| SEBS H1043 | A polystyrene-poly(ethylene/butylene)-polystyrene triblock copolymer, CAS Reg. No. 66070-58-4, having a polystyrene content of about 67 weight percent and a melt flow rate of about 5 grams per 10 minutes measured according to ASTM D 1238-13 at 200° C. and 5 kilogram load; obtained as TUFTEC ™ H1043 from Asahi Chemical. |
| SBS D1101 | Polystyrene-polybutadiene-polystyrene triblock copolymer, CAS Reg. No. 9003-55-8, having a polystyrene content of about 31 weight percent, and a melt flow rate of less than 1 gram per 10 minutes, measured according to ASTM D 1238-13 at 200° C. and 5 kilogram load; obtained as KRATON ™ D1101 from Kraton Performance Polymers Inc. |
| SBS D1102 | Polystyrene-polybutadiene-polystyrene triblock copolymer, CAS Reg. No. 9003-55-8, having a polystyrene content of about 29 weight percent, and a melt flow rate of about 8 grams per 10 minutes, measured according to ASTM D 1238-13 at 200° C. and 5 kilogram load; obtained as KRATON ™ D1102 from Kraton Performance Polymers Inc. |
| PP, low flow | Propylene homopolymer, CAS Reg. No. 9003-07-0, having a melt mass-flow rate of about 1.5 grams per 10 minutes, measured according to ASTM D1238-10 at 230° C. and a 2.16 kilogram load; obtained as PRO-FAX ™ HP403G from LyondellBasell. |
| PP, high flow | Propylene homopolymer, CAS Reg. No. 9003-07-0, having a melt mass-flow rate of about 36 grams per 10 minutes, measured according to ASTM D1238-10 at 230° C. and a 2.16 kilogram load; obtained as FP300F Homopolymer Polypropylene from Sunoco. |
| BPADP | Bisphenol A bis(diphenyl phosphate), CAS Reg. No. 5945-33-5; obtained as CR-741 from Daihachi Chemical Industry Co., Ltd. |
| LLDPE | Linear low density polyethylene, CAS Reg. No. 25087-34-7, having a density of 0.924 grams per cubic centimeter, and a melt volume-flow rate of about 20 cubic centimeters per 10 minutes at 190° C. and 2.16 kilogram load; obtained as M200024 from SABIC. |
| Mineral oil | Mineral oil, CAS Reg. No. 8012-95-1; obtained as KAYDOL ™ White Mineral Oil from Sonneborn Inc. |
| ZnS | Zinc sulfide, CAS Reg. No. 1314-98-3; obtained as SACHTOLITH ™ HD from Sachtleben Corp. |
| ZnO | Zinc oxide, CAS Reg. No. 1314-13-2; obtained as ZINKOXID AKTIV ™ from Bayer. |
| MgO | Magnesium oxide, CAS Reg. No. 1309-48-4; obtained as KYOWAMAG ™ 150 from Mitsui. |
| AO 168 | Tris(2,4-di-tert-butylphenyl) phosphite, CAS Reg. No. 31570-04-4; obtained as IRGAFOS ™ 168 from BASF. |

TABLE 1-continued

| Component | Description |
|---|---|
| AO 1010 | Pentaerythritol tetrakis(3,5-di-tert-butyl-4-hydroxyhydrocinnamate), CAS Reg. No. 6683-19-8; obtained as IRGANOX ™ 1010 from BASF. |
| TSAN | Poly(styrene-acrylonitrile)-encapsulated polytetrafluoroethylene, containing 50 weight percent polytetrafluoroethylene; obtained as CYCOLAC ™ INP449 from SABIC Innovative Plastics. |

Compositions comprising poly(phenylene ether) were compounded on a Toshiba TEM-37BS twin-screw extruder operating at a throughput of 40 kilograms/hour with zone temperatures of 50° C./150° C./280° C./280° C./280° C./280° C./280° C./290° C./290° C./290° C./290° C./290° C. from feed throat to die. All components were added at the feed throat of the extruder. The extrudate as cooled in a water bath and pelletized. Pellets were conditioned at 120° C. 3 hours prior to injection molding or extrusion molding.

Pipe samples having (1) an outer diameter of 25 millimeters and a wall thickness of 2.3 millimeters, and (2) an outer diameter of 63 millimeters and a wall thickness of 5.8 millimeters were profile extruded with a single-screw extruder with an annular die. Extrusion of the Comparative Example 1 (HDPE) composition was conducted using a barrel temperature of 200° C. Extrusion of the Comparative Examples 2-5 and Examples 1-4 (poly(phenylene ether)-containing) compositions was conducted using a barrel temperature of 240 to 280° C., depending on the melt flow properties of the compositions.

Compositions, material properties, and pipe properties are summarized in Table 2, where component amounts are expressed in parts by weight based on 100 parts by weight total of the poly(phenylene ether), the hydrogenated block copolymer, and the flame retardant.

Material Properties.

Tensile strength at yield values, expressed in units of megapascals, and tensile elongation at break values, expressed in units of percent, were determined according to ASTM D 638-14 at 23° C. using a Type I bar, a gage length of 50 millimeters, and a test speed of 50 millimeters/minute. A tensile strength value of at least 50 megapascals is desirable. Notched Izod impact strength values, expressed in units of joules/meter, were determined according to ASTM D 256-10 Method A at 23° C. using bar cross-sectional dimensions of 3.2 millimeters by 12.7 millimeters. The notched Izod impact strength value is desirably at least 350 joules/meter, specifically at least 400 joules/meter, more specifically at least 450 joules/meter. Flexural modulus and flexural stress at yield values, each expressed in units of megapascals, were determined according to ASTM D 790-10 at 23° C. using a bar with cross-sectional dimensions of 3.2 millimeters by 12.7 millimeters, a support span of 50.8 millimeters, and a test speed of 2.54 millimeters/minute. Flexural strength values are desirably at least 80 megapascals. Melt flow rate values, expressed in units of grams per 10 minutes, were determined according to ASTM D 1238-10, Procedure B, at a temperature of 250° C. and a 10 kilogram load. Flame-out time values, expressed in unites of seconds, were determined according to UL 94 Tests for Flammability of Plastic Materials for Parts in Devices and Appliances, 20 mm Vertical Burning Test, using a sample thickness of 1.5 millimeters. Flame-out times are desirably less than or equal to 5 seconds, specifically less than or equal to 3 seconds.

Pipe Properties.

In the drop hammer impact test, a 40 joule impact energy is applied to the pipe. When 63 millimeter outer diameter pipes are tested, a 2 kilogram hammer is dropped from a 2 meter height onto the pipe. When 25 millimeter outer diameter pipes are tested, a 4.85 kilogram hammer is dropped from a 0.82 meter height onto the pipe. To pass the test, the pipe must not crack. In the burst pressure test, water pressure inside the pipe is increased until the pipe cracks. To pass the test, the pipe must withstand a pressure of at least 9 megapascals without cracking. In the static pressure test, 35 megapascals hoop stress is maintained inside the pipe and the hours to failure measured. A value of at least 100 hours is considered passing. (Note that the current requirement for HDPE pipes is 100 hours at only 12.4 megapascals hoop stress.) In the flame retardancy test, a 25 millimeter length of pipe is exposed to a 960° C. flame for 30 seconds before the flame is removed, and the time for the flame to extinguish is measured. A value less than or equal to 10 seconds is considered passing. In the tensile strength and tensile elongation tests, a dumbbell-shaped sample is cut from the pipe and used for determination of tensile properties. A tensile strength of at least 40 megapascals is considered passing, as is a tensile elongation value of at least 10 percent.

TABLE 2

|  | C. Ex. 1 | C. Ex. 2 | C. Ex. 3 | C. Ex. 4 | C. Ex. 5 |
|---|---|---|---|---|---|
| COMPOSITIONS | | | | | |
| FR-HDPE | 100 | 0 | 0 | 0 | 0 |
| PPE | 0 | 68 | 50 | 19.3 | 42.9 |
| HIPS | 0 | 19 | 50 | 0 | 35.7 |
| PS | 0 | 0 | 0 | 16.5 | 0 |
| SEBS G1651 | 0 | 0 | 0 | 0 | 10.7 |
| SEBS H1043 | 0 | 0 | 0 | 8 | 0 |
| SBS D1101 | 0 | 0 | 0 | 0 | 10.7 |
| SBS D1102 | 0 | 0 | 0 | 11 | 0 |
| PP, low flow | 0 | 0 | 0 | 22.6 | 0 |
| PP, high flow | 0 | 0 | 0 | 22.6 | 0 |
| BPADP | 0 | 13 | 0 | 0 | 0 |
| LLDPE | 0 | 1.3 | 0.5 | 0 | 0 |
| Mineral oil | 0 | 0 | 1.5 | 0 | 0 |
| ZnS | 0 | 0.13 | 0 | 0.05 | 0.13 |
| ZnO | 0 | 0 | 0 | 0.05 | 0 |
| MgO | 0 | 0.13 | 0 | 0 | 0.13 |
| AO 168 | 0 | 0.09 | 0 | 0 | 0.09 |
| AO 1010 | 0 | 0 | 0 | 0.1 | 0 |
| TSAN | 0 | 0 | 0 | 0 | 0.13 |
| MATERIAL PROPERTIES | | | | | |
| Tens. strength at yield (MPa) | 10 | 79 | 56 | 33 | 49 |
| Tens. elong. at break (%) | 60 | 15 | 28 | 130 | 17 |
| Notched Izod (J/m) | 450 | 91 | 186 | 149 | 343 |
| Flex. mod. (MPa) | — | 2540 | 2550 | 1440 | 2050 |
| Flex. stress at yield (MPa) | — | 107 | 88 | 48 | 74 |
| Melt flow rate (g/10 min) | — | — | — | — | 8.5 |
| Flame-out time (sec) | — | 2.4 | — | — | — |
| PIPE PROPERTIES | | | | | |
| Drop hammer impact, 25 mm pipe | Passed | — | Failed | Failed | Passed |

TABLE 2-continued

|  | | | | | |
|---|---|---|---|---|---|
| Drop hammer impact, 63 mm pipe | Passed | Failed | Failed | Failed | Passed |
| Burst pressure, 25 mm pipe | Failed | Passed | Passed | — | Passed |
| Static pressure failure time, 25 mm pipe (hours) | <1 | — | — | — | <1 |
| Flame extinguished time, 25 mm pipe (sec) | — | — | — | — | >120 |
| Flame extinguished time, 63 mm pipe (sec) | 3 | 6 | >120 | >120 | >120 |
| Tensile strength, 25 mm pipe (MPa) | <20 | — | — | — | 50 |
| Tensile elongation, 25 mm pipe (%) | — | — | — | — | 60 |

| | Ex. 1 | Ex. 2 | Ex. 3 | Ex. 4 |
|---|---|---|---|---|
| COMPOSITIONS | | | | |
| FR-HDPE | 0 | 0 | 0 | 0 |
| PPE | 77.5 | 75 | 70 | 60 |
| HIPS | 0 | 0 | 0 | 13 |
| PS | 0 | 0 | 0 | 0 |
| SEBS G1651 | 9.5 | 12 | 15 | 12 |
| SEBS H1043 | 0 | 0 | 0 | 0 |
| SBS D1101 | 0 | 0 | 0 | 0 |
| SBS D1102 | 0 | 0 | 0 | 0 |
| PP, low flow | 0 | 0 | 0 | 0 |
| PP, high flow | 0 | 0 | 0 | 0 |
| BPADP | 13 | 13 | 15 | 15 |
| LLDPE | 0 | 0 | 0 | 0 |
| Mineral oil | 0 | 0 | 0 | 0 |
| ZnS | 0.15 | 0.15 | 0.15 | 0.15 |
| ZnO | 0.15 | 0.15 | 0.15 | 0.15 |
| MgO | 0 | 0 | 0 | 0 |
| AO 168 | 0.1 | 0.1 | 0.1 | 0.1 |
| AO 1010 | 0 | 0 | 0 | 0 |
| TSAN | 0 | 0 | 0 | 0 |
| MATERIAL PROPERTIES | | | | |
| Tens. str. at yield (MPa) | 64.3 | 58.2 | 54 | 54.2 |
| Tens. elong. at break (%) | 8.92 | 13.5 | 12.3 | 12.98 |
| Notched Izod (J/m) | 438 | 505 | 563 | 456 |
| Flex. mod. (MPa) | 2290 | 2060 | 2030 | 2130 |
| Flex. stress at yield (MPa) | 101 | 94.5 | 88.2 | 87.7 |
| Melt flow rate (g/10 min) | 1.83 | 2.29 | 3.3 | 5.35 |
| Flame-out time (sec) | 2.2 | 1.24 | 1.04 | — |
| PIPE PROPERTIES | | | | |
| Drop hammer impact, 25 mm pipe | Passed | Passed | Passed | Passed |
| Drop hammer impact, 63 mm pipe | Passed | Passed | Passed | Passed |
| Burst pressure, 25 mm pipe | Passed | Passed | Passed | Passed |
| Static pressure failure time, 25 mm pipe (hours) | >672 h | >672 h | >672 h | >672 h |
| Flame extinguished time, 25 mm pipe (sec) | 8.9 | 7.1 | 7.7 | 6.9 |
| Flame extinguished time, 63 mm pipe (sec) | 3.2 | 4.2 | 3 | 3.8 |
| Tensile strength, 25 mm pipe (MPa) | 58 | 53 | 46 | 46 |
| Tensile elongation, 25 mm pipe (%) | 25.6 | 50 | 52 | 62 |

The results in Table 2 show that none of Comparative Examples 1-5 exhibits an acceptable balance of the pipe properties drop hammer impact strength, burst pressure resistance, static pressure resistance, flame retardancy, and tensile strength. Specifically, Comparative Example 1 was deficient in burst pressure resistance, static pressure resistance, and tensile strength. Comparative Example 2 was deficient in drop hammer impact strength. Comparative Examples 3 and 4 were deficient in drop hammer impact strength and flame retardancy. And Comparative Example 5 was deficient in static pressure resistance and flame retardancy.

In contrast, Examples 1-4 each exhibit a desirable balance of the pipe properties drop hammer impact strength, burst pressure resistance, static pressure resistance, flame retardancy, and tensile strength.

The invention claimed is:

1. A water pipe for mining operations
    wherein the water pipe has an outer diameter of 20 to 200 millimeters and a wall thickness of 2 to 20 millimeters; and
    wherein the water pipe comprises a composition comprising
        58 to 82 parts by weight poly(phenylene ether),
        8 to 18 parts by weight of a hydrogenated block copolymer of an alkenyl aromatic monomer and a conjugated diene,
        0 to 15 parts by weight of polystyrene selected from the group consisting of homopolystyrenes, rubber-modified polystyrenes, and combinations thereof, and
        10 to 20 parts by weight of a flame retardant comprising an organophosphate ester,
    wherein parts by weight values are based on 100 parts by weight total of the poly(phenylene ether), the hydrogenated block copolymer, the polystyrene, and the flame retardant.

2. The water pipe of claim 1, wherein the water pipe consists of the composition.

3. The water pipe of claim 1, wherein the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform.

4. The water pipe of claim 1, wherein the composition comprises 65 to 75 parts by weight of the poly(phenylene ether).

5. The water pipe of claim 1, wherein the composition comprises 12 to 16 parts by weight of the hydrogenated block copolymer.

6. The water pipe of claim 1, wherein the composition excludes the polystyrene.

7. The water pipe of claim 1, wherein the flame retardant consists of the organophosphate ester.

8. The water pipe of claim 1, wherein the organophosphate ester comprises bisphenol A bis(diphenyl phosphate).

9. The water pipe of claim 1, wherein the composition consists of
    58 to 82 parts by weight poly(phenylene ether),
    8 to 18 parts by weight of the hydrogenated block copolymer,
    0 to 15 parts by weight of the polystyrene selected from the group consisting of homopolystyrenes, rubber-modified polystyrenes, and combinations thereof,
    10 to 20 parts by weight of the flame retardant, and
    0 to 5 parts by weight of an additive selected from the group consisting of stabilizers, lubricants, processing aids, drip retardants, UV blockers, dyes, pigments, antioxidants, anti-static agents, mineral oil, metal deactivators, and combinations thereof.

10. The water pipe of claim 1,
    wherein the water pipe consists of the composition;
    wherein the poly(phenylene ether) comprises a poly(2,6-dimethyl-1,4-phenylene ether) having an intrinsic viscosity of 0.4 to 0.5 deciliter per gram, determined by Ubbelohde viscometer at 25° C. in chloroform;
    wherein the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer, and wherein the polystyrene-poly(ethylene-propylene)-polystyrene triblock copolymer has a weight average molecular weight of 240,000 to 300,000 daltons, determined according to size exclusion chromatography using polystyrene standards;

wherein the flame retardant consists of the organophosphate ester, and wherein the organophosphate ester comprises bisphenol A bis(diphenyl phosphate); and wherein the composition comprises
65 to 75 parts by weight of the poly(phenylene ether),
12 to 16 parts by weight of the hydrogenated block copolymer,
0 to 5 parts by weight of the polystyrene, and
12 to 16 parts by weight of the flame retardant.

11. The water pipe of claim 1, wherein the hydrogenated block copolymer is a polystyrene-poly(ethylene-propylene)-polystyrene triblock copolymer having a polystyrene content of 25 to 35 weight percent, based on the weight of the polystyrene-poly(ethylene-propylene)-polystyrene triblock copolymer.

12. The water pipe of claim 11, wherein the polystyrene-poly(ethylene-propylene)-polystyrene triblock copolymer has a weight average molecular weight of 240,000 to 300,000 daltons, determined by size exclusion chromatography using polystyrene standards.

13. The water pipe of claim 1, wherein the composition comprises 1 to 15 parts by weight of the polystyrene.

14. The water pipe of claim 13, wherein the polystyrene consists of the homopolystyrene.

15. The water pipe of claim 13, wherein the polystyrene consists of the rubber-modified polystyrene.

16. The water pipe of claim 1, wherein the pipe comprises a layer of the composition and an external layer surrounding and in contact with the layer of the composition.

17. The water pipe of claim 16, wherein the external layer is a layer of a high-density polyethylene-based composition.

18. A water pipe for mining operations,
wherein the water pipe comprises a composition comprising
58 to 82 parts by weight poly(phenylene ether),
8 to 18 parts by weight of a hydrogenated block copolymer of an alkenyl aromatic monomer and a conjugated diene,
0 to 15 parts by weight of polystyrene selected from the group consisting of homopolystyrenes, rubber-modified polystyrenes, and combinations thereof, and
10 to 20 parts by weight of a flame retardant comprising an organophosphate ester, wherein parts by weight values are based on 100 parts by weight total of the poly(phenylene ether), the hydrogenated block copolymer, the polystyrene, and the flame retardant.

* * * * *